US012135213B1

(12) United States Patent
Grundy et al.

(10) Patent No.: US 12,135,213 B1
(45) Date of Patent: Nov. 5, 2024

(54) SENSOR POSITIONING APPARATUS

(71) Applicant: Opsis Health, Inc., Golden, CO (US)

(72) Inventors: Kevin P. Grundy, Emmett, ID (US);
David Gallatin, Wenatchee, WA (US);
Dion Damato, Incline Village, NV
(US); Damon Campbell, Pacific Grove,
CA (US); Ryan Liu, Fremont, CA (US)

(73) Assignee: Opsis Health, Inc., Golden, CO (US)

( * ) Notice: Subject to any disclaimer, the term of this patent is extended or adjusted under 35 U.S.C. 154(b) by 377 days.

(21) Appl. No.: 17/671,889

(22) Filed: Feb. 15, 2022

Related U.S. Application Data

(60) Provisional application No. 63/153,727, filed on Feb. 25, 2021, provisional application No. 63/153,791, filed on Feb. 25, 2021.

(51) Int. Cl.
| | | |
|---|---|---|
| *G01C 21/16* | (2006.01) | |
| *G06T 7/70* | (2017.01) | |
| *H04N 23/70* | (2023.01) | |

(52) U.S. Cl.
CPC .............. *G01C 21/16* (2013.01); *G06T 7/70* (2017.01); *H04N 23/70* (2023.01); *G06T 2207/30244* (2013.01)

(58) Field of Classification Search
CPC . G01C 21/16; G06T 7/70; G06T 2207/30244; H04N 23/70
See application file for complete search history.

(56) References Cited

U.S. PATENT DOCUMENTS

| | | | |
|---|---|---|---|
| 8,508,751 B1 * | 8/2013 | Shen | H04N 1/00559 |
| | | | 358/1.1 |
| 11,094,122 B2 | 8/2021 | Stöcker | |
| 11,435,305 B2 | 9/2022 | Wang et al. | |
| 11,435,485 B2 | 9/2022 | McDaniel et al. | |
| 11,438,565 B2 | 9/2022 | Trevor et al. | |
| 2020/0314342 A1 * | 10/2020 | Bouwman | G03B 17/561 |
| 2022/0051424 A1 * | 2/2022 | Grundy | G06V 10/17 |

FOREIGN PATENT DOCUMENTS

| | | | | |
|---|---|---|---|---|
| CN | 113016004 A * | 6/2021 | | B29C 64/386 |
| WO | WO-2017112280 A1 * | 6/2017 | | H04L 67/06 |
| WO | WO-2021114777 A1 * | 6/2021 | | G06K 9/00201 |

* cited by examiner

*Primary Examiner* — Francis C Gray
(74) *Attorney, Agent, or Firm* — Jaffery Watson Hamilton & DeSanctis LLP

(57) ABSTRACT

A sensor device having one or more sensor elements to provide first positioning information indicative sensor device position with respect to an object of interest is detachably mounted to an appliance on which the object is disposed. A moveable member of the appliance is actuated to effect change in relative positioning of the sensor device and object while one or more appliance-integrated sensor components generate second positioning information indicative of change in spatial position of the moveable member. A processing unit synthesizes, from the first and second positioning information, third positioning information indicative of a spatial position of at least one of the sensor device or the moveable member after actuation of the moveable member.

21 Claims, 6 Drawing Sheets

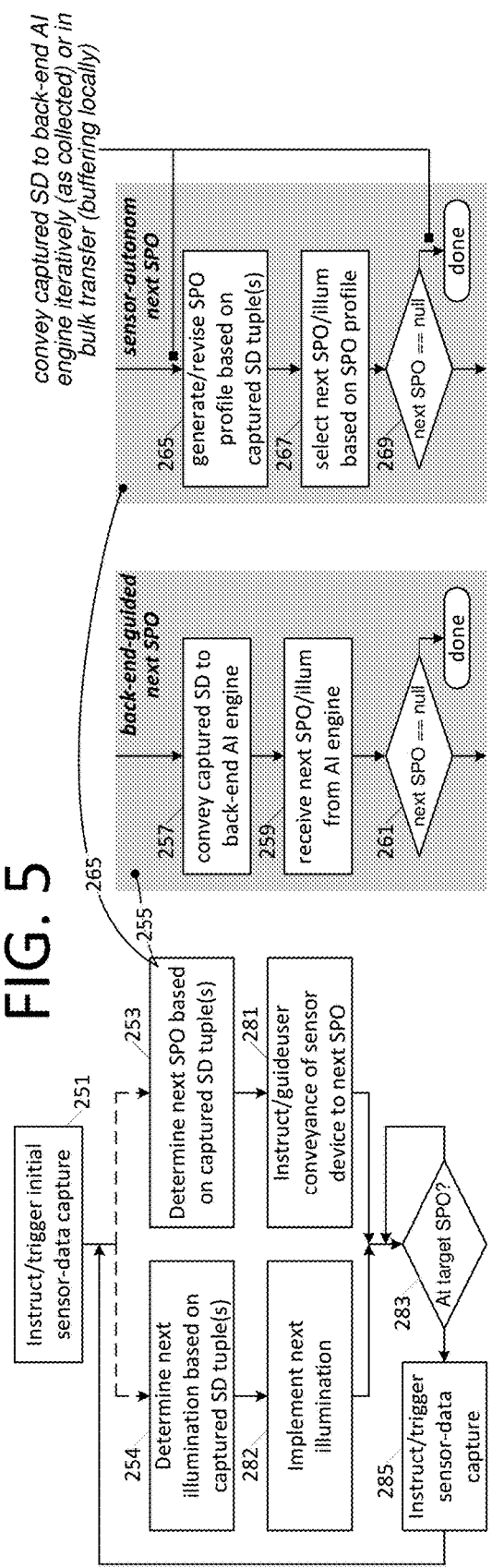
FIG. 5
FIG. 6
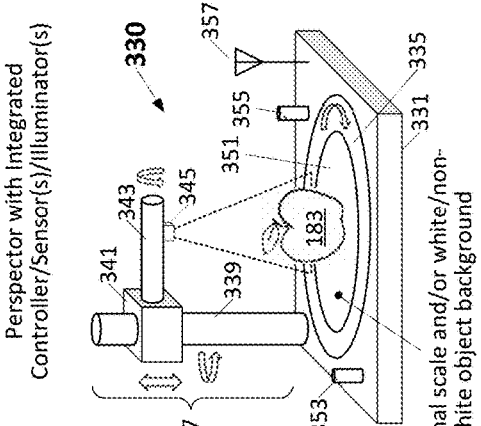
FIG. 7
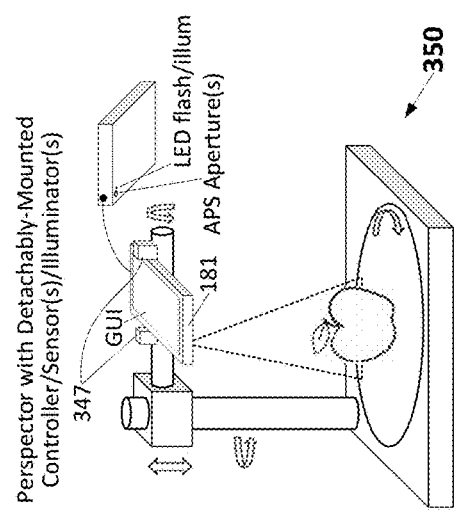
FIG. 8

*Circumnavigating Perspector with Object Manipulator*

*over-mount perspector*

*Circumnavigating Perspector*

*Fly-Over Perspector*

*Detachable/Stowable Components*

SENSOR POSITIONING APPARATUS

CROSS REFERENCE TO RELATED APPLICATIONS

This application hereby incorporates by reference and claims the benefit of U.S. provisional patent application No. 63/153,727 filed Feb. 25, 2021 and U.S. provisional patent application No. 63/153,791 filed Feb. 25, 2021.

DRAWINGS

The various embodiments disclosed herein are illustrated by way of example, and not by way of limitation, in the figures of the accompanying drawings and in which like reference numerals refer to similar elements and in which:

FIG. 5 illustrates an exemplary data capture profile that may be implemented by the controller/programmed-processor of a user-conveyed sensor-device;

FIG. 6 illustrates an exemplary data capture profile that may be implemented by program code execution within the controller of a "perspector" appliance;

FIGS. 7 and 8 illustrate perspector embodiments having integrated and detachably-mounted sensor(s), respectively;

Figure 13:
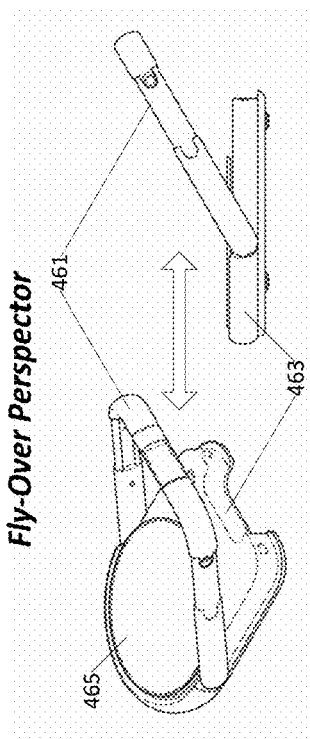
Figure 12:
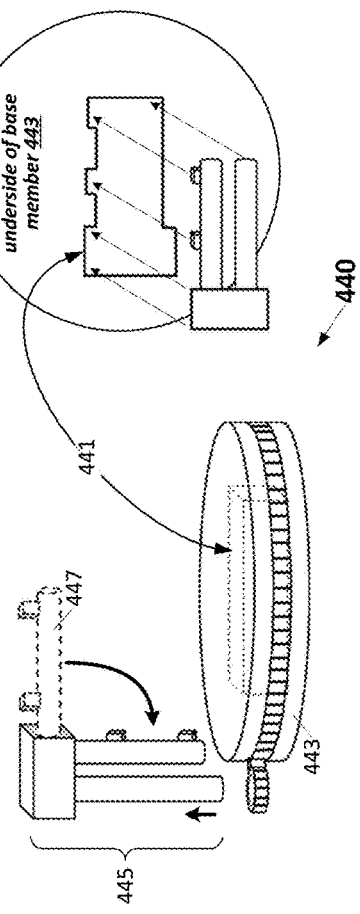

FIG. 12 illustrates a perspector embodiment that may be disassembled and compacted (folded, retracted, etc.) for portable/compact stowage; and FIG. 13 illustrates a "fly-over" perspector embodiment having a fly-over arm rotatably attached to a base member to enable one or more sensors/illuminators integrated within the fly-over arm, or sensor device removably attached to the fly-over arm, to follow controlled, arc-trajectory with respect to an object of interest.

Figure 14:
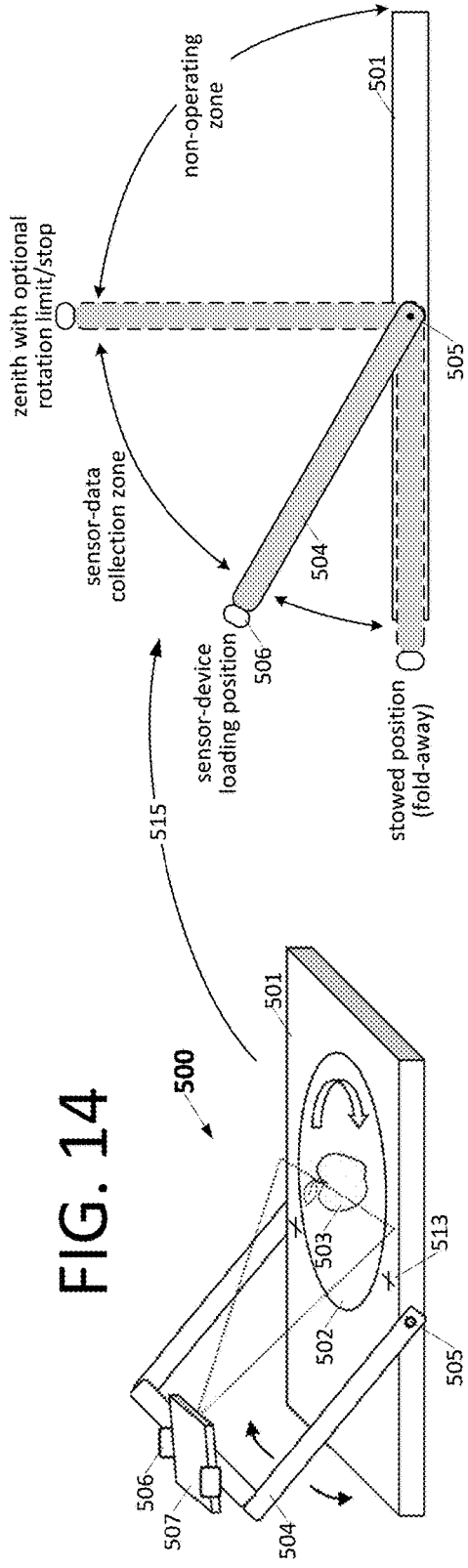

FIG. 14 illustrates a more generalized fly-over perspector of FIG. 13 in accordance with an embodiment of the present disclosure.

Figure 15:
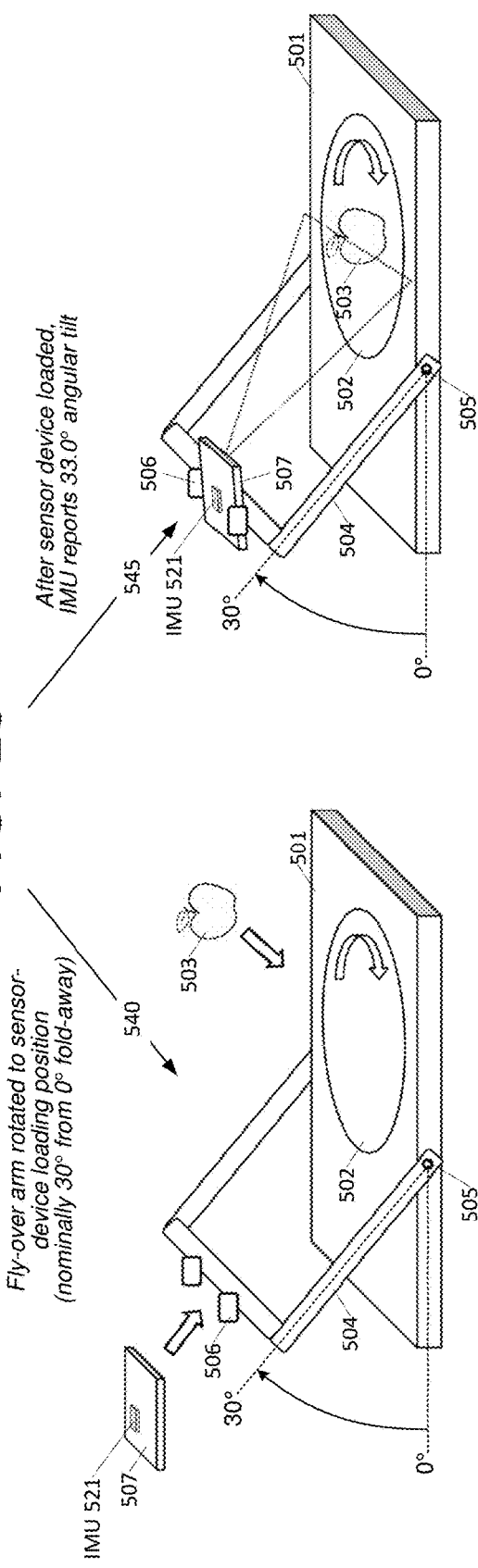

FIG. 15 illustrates exemplary positioning of a perspector fly-over arm in accordance with an embodiment of the present disclosure.

Figure 16:
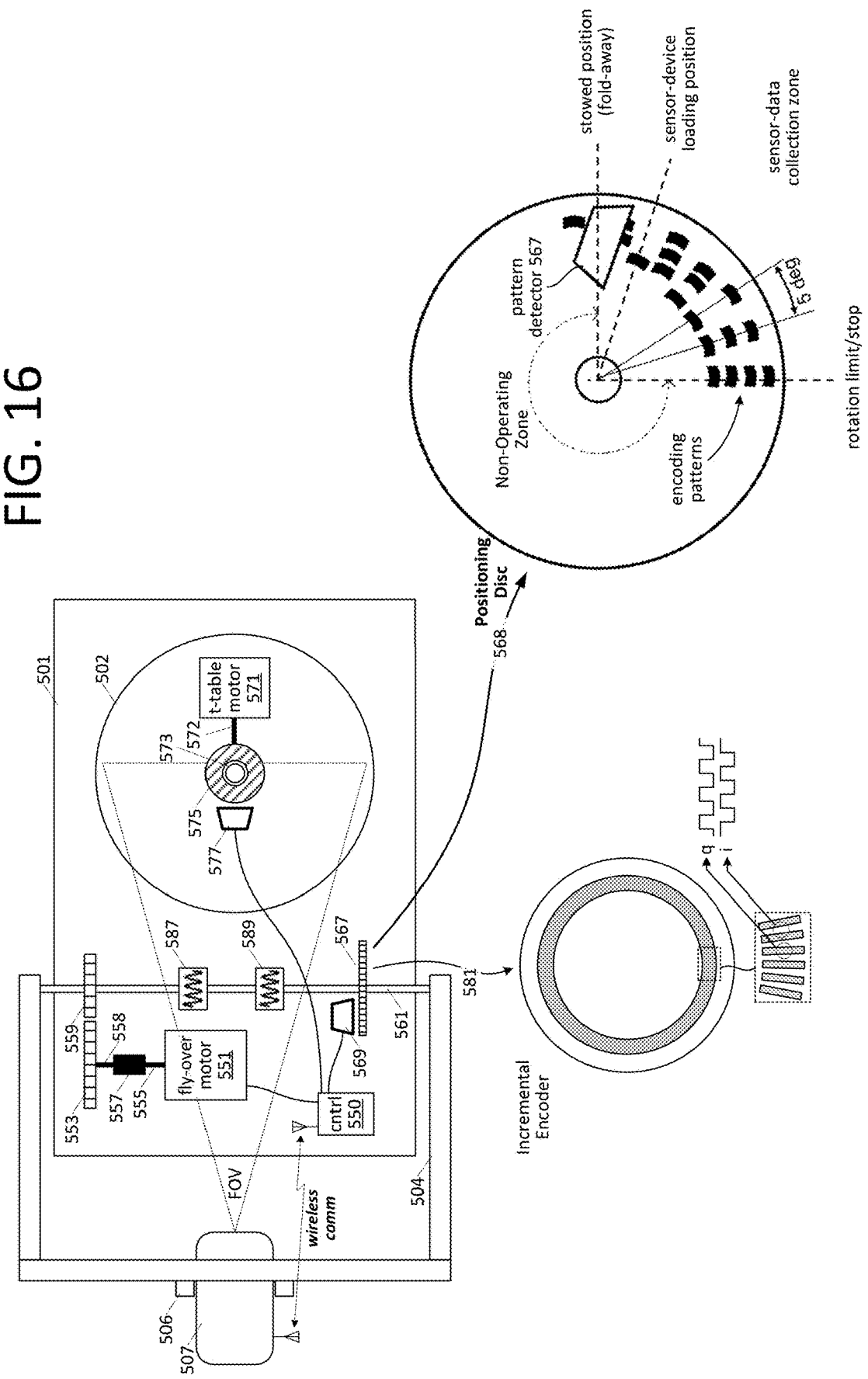

FIG. 16 illustrates an underside view of the perspector of FIG. 15 in accordance with an embodiment of the present disclosure.

DETAILED DESCRIPTION

In various embodiments herein, a sensor device generates images of an object from successive positional/illuminatory perspectives effected according to a predetermined or dynamically-generated recognition-training/object-modeling profile. In a number of embodiments, the sensor device conveys the perspective images to a cloud-based artificial-intelligence engine (i.e., accessed via Internet, intranet, wide-area network, local-area network, or other network or interconnection of computing devices) and receives from the AI engine, in response, data-capture guidance that informs next position/illumination (next perspective) for ensuing object-image generation. The sensor device (also referred to herein as "perspective information generator") may be implemented, in alternative embodiments, by a (i) portable/handheld computing device having one or more integrated sensors and a user interface (e.g., smartphone, tablet, smart-camera or other "smart" sensor having an active pixel sensor (APS) imager, charge-coupled-device (CCD) imager, hyper-spectral imager, inertial measurement unit (IMU), illumination source(s), time-of-flight sensor, LIDAR, etc.) that is conveyed to successive positional perspectives and/or transitioned between different object-illumination settings by a human operator, or (ii) a "perspector" appliance having-together with a detachably mounted portable/handheld computing device and/or integrated sensor(s)/illuminator(s)/compute-controller-one or more actuators to convey sensor(s) and/or sensed-object to successive perspective-capture positions. In other embodiments, the perspector appliance may generate (or enable generation of) successive perspective images through dynamic adjustment of one or more integrated and/or detachably-mounted illumination sources, with or without mechanical actuation of sensors or sensed-object.

Figure 1:
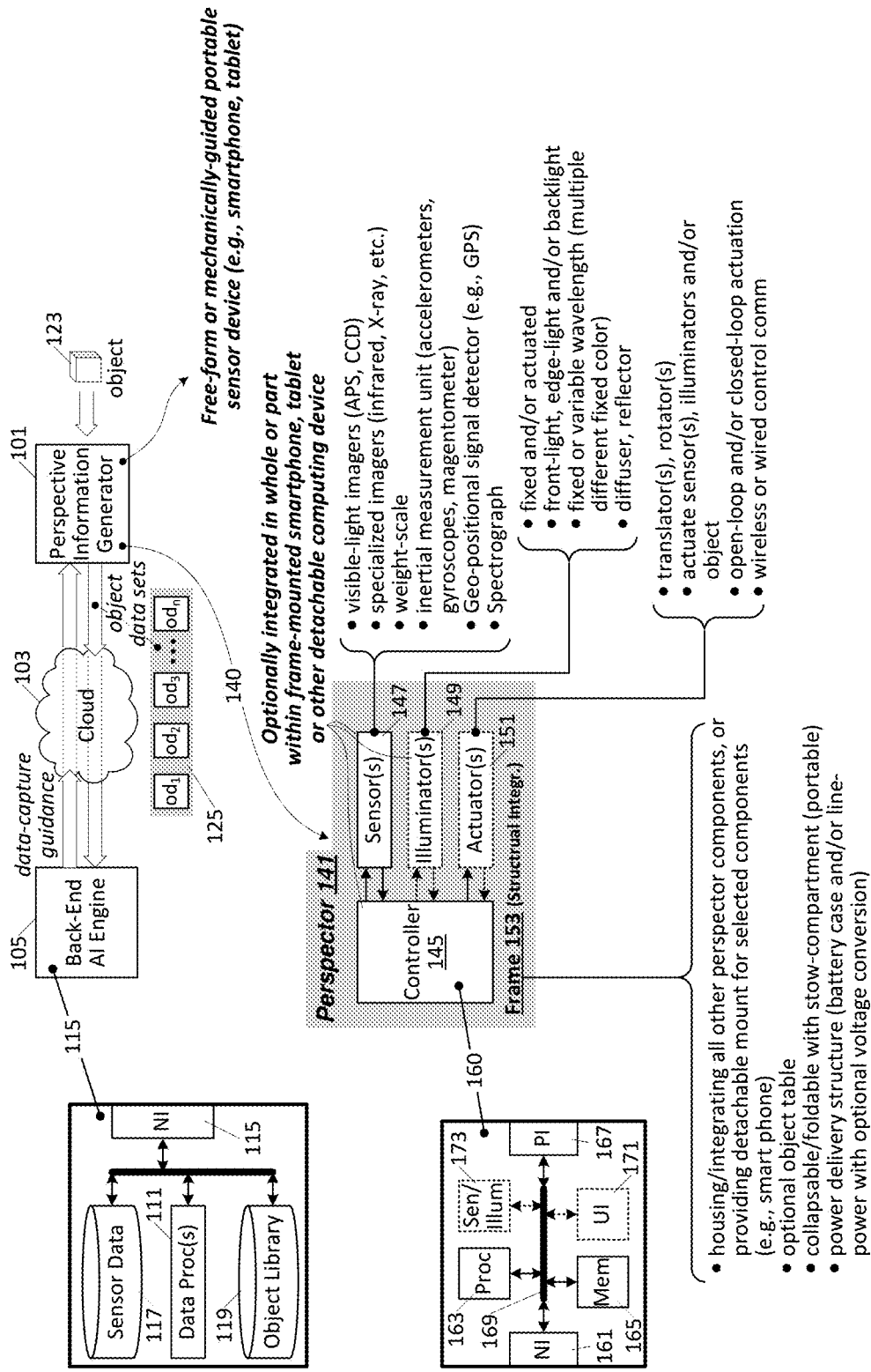
FIG. 1 illustrates an embodiment of an object-training recognition system having a perspective information generator coupled, via a digital communications network, to a back-end artificial-intelligence (or other image processing) engine.

FIG. 1 illustrates an embodiment of an object-training recognition system 100 having a perspective information generator 101 coupled, via digital communications network ("cloud" 103), to a back-end AI engine 105. As shown in detail view 110, AI engine 105 may be implemented by one or more computing devices—e.g., one or more interconnected data processors 111, network interfaces 115 and storage devices, the latter to store, for example sensor data (117) and an object library (119)—co-located within a datacenter or distributed across multiple cloud-connected compute facilities, and the cloud interconnect 103 may be constituted (in whole or part) by the Internet, one or more wide area networks (WANs), local area networks (LANs) and/or any other practicable data communication network. In the depicted example, perspective information generator 101 is implemented, in a first embodiment, by a handheld (or otherwise portable) sensor device that is conveyed between object perspectives (i.e., physically moved relative to an object of interest 123 and/or exposed to varying illuminations with respect to object 123) by a human operator, and in a second embodiment by a perspector—an appliance that transitions an integrated and/or detachably mounted sensor device between successive object perspectives autonomously or in response to guidance from the AI engine. In either embodiment (user-wielded sensor device or perspector), information generator 101 produces "perspective information" useful for training an object recognition system implemented in whole or part by AI engine 105, the perspective information including, for example and without limitation, images of an object of interest obtained from different positional and/or illuminatory perspectives-moving (translating and/or rotating) an image-sensor, object-of-interest or both to vary the positional perspective, and/or varying an illumination setting (e.g., switching one or more illumination sources on or off, varying the output intensity/luminance, wavelength/color, transitioning between contrast-backgrounds, surrounds, diffusion structures, etc.) to change the object illumination (and thus the image-sensor perspective). Perspective information may be supplemented by (and deemed to include) various object-characterizing information (e.g., gravitational weight of object 123, object geo-positional information, spectroscopic information, etc.) and/or metadata inferred, observed or otherwise perceived with respect to object 123 (e.g., audible information emitted by object 123 and/or human observer naming or otherwise characterizing object 123; bar code, Quick Response (QR) code or the like adhered to or associated with object 123, etc.). Yet other "perspective information may be synthesized from directly perceived perspective information, including object size/extent (e.g., synthesized by triangulating object metes and bounds from perspective and/or stereoscopic images), object components (e.g., divining two or more distinct objects within a group of objects, such as distinct nutritional substances (foods) on a shared platter) and so forth.

In the FIG. 1 embodiment, information generator 101 conveys perspective information to AI engine 105 in a sequence of object data sets 125—individual collections of data obtained from respective positional/illuminatory perspectives—with the number of object data sets potentially varying with dynamically-determined object complexity. In one implementation, for example, a predetermined capture profile (or "preset") is used to establish an initial number of object perspectives to be captured at relative positional offsets (e.g., image sensor circumnavigating the object of interest over a 180 degree arc to yield perspective information capture at nine (9) sensor positions progressively spaced at ~20° from one another), with AI engine 105 and/or a local controller (within sensor device/perspector) updating that initial capture profile based, for example, on object complexity and/or training uncertainty. In the case of a platter of food containing multiple different food items, for example, AI engine 105 may determine that additional capture resolution (positional perspectives) along the sensor-traversed arc and/or additional circumnavigating arcs (e.g., the points of collection effectively forming a three-dimensional dome over the object of interest) are needed to build an effective object-recognition data record (e.g., for storage in object library 119) and/or object-modeling/volume-modeling data structure. The data capture profile (or training sequence) may additionally or alternatively be adjusted or otherwise supplemented in response to input from a human operator (i.e., an individual observing perspector operation or wielding a handheld sensor device), for example, supplying information via the perspector/sensor-device user-interface (touchscreen, keypad, microphone/voice, imager/gesture-facial expression, etc.) to establish an initial capture profile or adjust an initial profile. As a specific example, an image of the object of interest (which may include multiple distinct objects as in a platter of food) may be presented on a display (e.g., graphical user interface) of the sensor-device or perspector with a prompt for the user to draw or adjust (through touchscreen or other input) a bounding outline (rectangular box, circle/ellipse, polygon or amorphous shape) that encompasses the object of interest, including splitting the bounding outline into multiple outlines that encompass distinct objects within an imager field-of-view (FOV). The user supplied/adjusted bounding outline(s) may then be input to local or remote processing units (i.e., cloud-based AI engine) for purposes of adjusting/revising an initial data capture profile and/or generating the initial data capture profile.

In an embodiment shown in Figure-1 detail view 140, perspector 141 includes a controller 145 together with one or more sensors 147 and, optionally, one or more illuminators 149, one or more actuators 151 and frame 153, the latter effecting a structural integration of the controller, sensor(s), illuminator(s) and/or actuator(s). The sensors may be integrated in whole or part within a detachably-mounted-to-frame "smart" device (e.g., smartphone, spectrometer, tablet, or other detachable computing device having on-board sensors) and, conversely, may be integrated in whole or part within (e.g., housed within or attached to) one or more components of the perspector frame. As in the case of a user-wielded portable sensor device (i.e., implementation of system 100 sans perspector), the sensors may include various visible-light imagers (e.g., APS, CCD), specialized imagers (infrared, ultra violet, X-ray, time-of-flight/distance including LIDAR, etc.), inertial-measurement sensors (e.g., accelerometers, gyroscopes, magnetometers as may be implemented, for example, in a 9-axis inertial measurement unit (IMU)), positional encoders, interferometers, luminance/light-intensity measuring elements, proximity sensors, auditory sensors, geo-positional signal detector (e.g., for detecting/receiving signals from global-positioning-system (GPS) satellites), gravitational-weight sensor, spectrograph and/or any other practicable sensor capable of generating information useful for object recognition/modeling. Optional illuminators 149 may include fixed and/or actuated light sources capable of front-lighting, edge-lighting, backlighting or otherwise lighting an object of interest. One or more illuminators may emit light at different wavelength (e.g., different color within the visible-light spectrum) than other illuminator(s) and/or the wavelength of light emitted by one or more illuminators may vary in response to color-control/wavelength-control signal(s) from controller 145. Illuminator(s) may be supplemented (and deemed to include) various light-modifying structures (e.g., refractors, reflectors, diffusers, prisms, contrast-backgrounds, etc.). Illuminators (including light-modifying structures) may be implemented in whole or part within a detachably mounted sensor device (e.g., source of flash or continuous light integrated within a smartphone, tablet or the like) and/or integrated within the frame 153 or actuator components (or stand-alone components) of the perspector 141.

Still referring to perspector 141 (FIG. 1), optional actuators 151 may include any mechanism(s) capable of moving (translating and/or rotating) a sensor, illuminator, and/or object to enable varied visual perspectives, including motorized actuators powered by electrical potential (line power or battery), gravitational/kinetic potential (e.g., supplied by a user by spring-loading, fluid-compression, mass-lifting etc.) or any other practicable source of energy for powering mechanical actuation. The actuators themselves may effect linear translation, axial rotation, radial revolution, circumnavigation or any other motion of sensor and/or object useful for achieving varied perspective views. Actuator control signals (i.e., to trigger motion start/stop and/or control actuation speed, direction, velocity, acceleration, digital movement resolution, etc.) may be transmitted from controller 145 to actuator(s) 151 via wired or wireless interfaces (the latter including, for example and without limitation, communication via various radio-frequency standards such as Bluetooth, Near-field Communication (NRC), Wi-Fi, etc.) with the signaling media (wire, over-air) and/or communication protocol varying from actuator to actuator. The control signals may trigger open-loop or closed-loop actuation/motion, in the latter case with one or more positional sensors (e.g., rotary or linear positional-encoders-absolute or relative-interferometers, proximity sensors, etc.) providing feedback for closed-loop actuator control.

Perspector frame 153 (or chassis or housing or other component-interconnect structure) may be implemented by one or more removably-attached and/or integrally formed structural members-including one or more structural members (or groups of structural members) lacking attachment to one or more other structural members-capable of integrating, housing, and/or providing mounts or attach points for other perspector components (e.g., sensors, illuminators, actuators). In a number of embodiments, frame 153 includes a platform or table onto which the object of interest is to be placed (such "object table" being subject to translation in one two or three dimensions, and/or axial/radial rotation), including a platform having a degree of transparency to permit backlighting (i.e., from one or more illumination sources), installation of distinct and possibly non-attached sets of such structural members (e.g., swappable backgrounds or light filters of different color, reflectivity etc.), stowage compartments for compact fold-away storage footprint, power-delivery components (e.g., for connection to line power and/or insertion of removable electric batteries).

Still referring to perspector 141 of FIG. 1, controller 145 may be implemented by a variety of computing architectures and, as shown in detail view 160, may include one or more network interfaces 161 (e.g., for communicating with AI engine 105 via interconnect cloud 103), processors 163, memory components 165, and peripheral interfaces ("PI" to provide, for example, wired or wireless communications with respect to sensors 147, illuminators 149 and/or actuators 151) coupled to one another by any practicable interconnect structures (illustrated conceptually by bus 169, but may include various distinct signaling paths between depicted components). Controller 145 may also include a user interface (e.g., graphical-user-interface (GUI) display, virtual and/or physical keypad such as a touchscreen, microphone, speaker, haptic devices, etc.) and/or one or more integrated sensors and/or illumination elements 173 (e.g., light-emitting diode (LED) or other light-producing components). As discussed above, controller 145 wirelessly or conductively issues control signals to sensors 147 as necessary to trigger/initiate sensing operations and/or control sensor operation. In the case of APS imagers, for example, controller 145 may issue control signals to vary effective imager resolution from image to image (deemed a form of perspective variance for at least some embodiments herein), exchanging lower resolution for higher intensity or vice-versa through photocharge binning and/or pixel-readout-signal combination (charge binning, voltage binning, etc.). In a number of embodiments, controller 145 directly receives sensor output (e.g., pixel-value constituents of digital images, IMU output, GPS values, object-weight values, etc.), optionally performs sensor-data processing (e.g., finishing/enhancing digital images or otherwise conditioning sensor output signals) before outputting the sensor data (in the form of aforementioned object data sets 125) via network interface 161 to cloud-based AI engine 105. In other embodiments, one or more sensors may output sensor data in whole or part directly to the AI engine (e.g., through a network interface) rather than via controller 145.

As with sensors 147, controller 145 may issue control signals wirelessly or via wired control-signal conductors to one or more illuminators 149 (e.g., to switch illumination elements on/off, control illumination intensity, wavelength, etc.) and/or actuators 151 and may optionally receive status and/or handshaking information in return (e.g., positional feedback in the case of closed-loop motion control). Though depicted in the example 160 as a consolidated unit, controller 145 or any components thereof may be distributed among other perspector components. For example, one or more of processors 163 (and/or memories 165) shown in detail view 160 may be integrated within or disposed in proximity to (or be deemed part of) respective actuators 151—for example, to effectuate closed-loop motion (e.g., controlling motion profile, positional destination, etc.). Also, as discussed above, controller 145 may be integrated with some or all of sensors 147 and/or illuminators 149 within a frame-mounted smartphone, tablet or other independently operable and perspector-detachable computing device.

Figure 2:
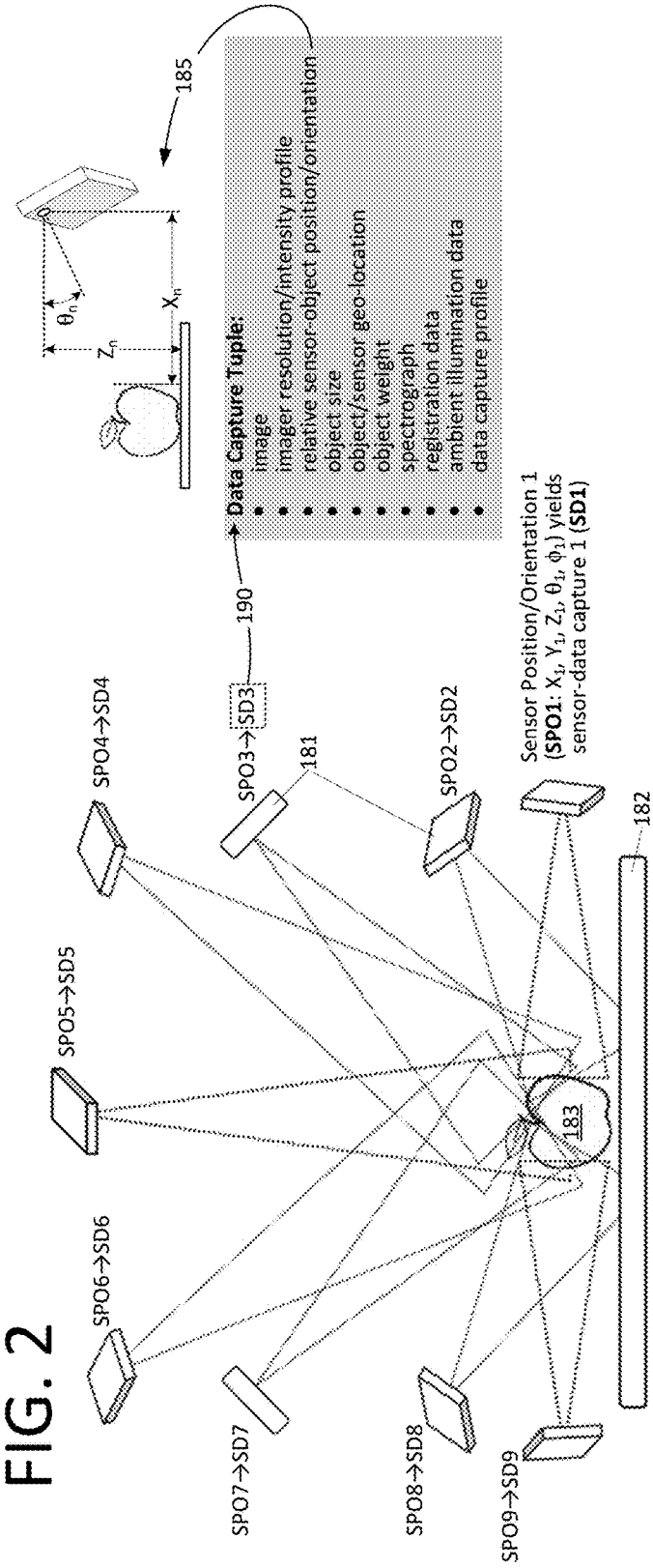
FIG. 2 illustrates an exemplary sequence of sensor-device positions/orientations (effected by user or perspector conveyance of one or more sensors) at which respective sensor data sets (SD1-SDn; also referred to herein as object data sets) are captured.

FIG. 2 illustrates an exemplary sequence of sensor-device positions/orientations (effected by user or perspector conveyance of one or more sensors) at which respective sensor data sets (SD1-SDn; also referred to herein as object data sets) are captured. In the depicted example, a sensor device 181 is implemented (at least in part) by a smartphone having an integrated camera (e.g., APS imager) and luminance-intensity meter, as well as an IMU capable of tracking sensor device position in three-dimensional (3D) space-a position expressed, in this example, by Cartesian coordinates of the camera aperture relative to a predetermined point (e.g., 'x', 'y' and 'z' distances from camera aperture to center-point of object platform 182, edge of object of interest 183, etc.) together with angular pitch and roll coordinates (i.e., θ and φ, respectively, with θ being, for example, the angle between an axis normal to the camera aperture and Cartesian axis 'x', and φ being the angle between the camera-normal axis and the 'y' Cartesian axis—'φ' and 'y' being normal to and thus unshown in the 2D detail view at 185). In other embodiments, particularly those having two or more off-axis imagers (e.g., stereoscopic imagers), a yaw coordinate/scalar (i.e., representing/indicating angular rotation about an axis normal to the aperture-surface of the sensor device) may be recorded within the sensor data set. In the FIG. 2 embodiment, each sensor-device position/orientation (SPO) refers to a relative attitude of one or more sensors with respect to the object of interest (183) and thus may be effected by repositioning/reorienting sensor device 181, object 183, or both. Also, absent explicit or contextually-clear distinction herein between angular orientation of sensor device 181 (e.g., θ and/or φ angular adjustment) and Cartesian (or polar-coordinate) position of sensor device 181, sensor "position" (or sensor-device position) should be understood to encompass both angular orientation and 3D location (Cartesian disposition of the subject sensor(s)/sensor-device. Further, while the object of interest (183) is depicted as a relatively small object in FIG. 2 and embodiments and examples discussed below (i.e., a food item and more specifically an apple), the object of interest may in all cases be substantially larger (e.g., human being, automobile, building or other large-scale mechanical construct) or smaller than object 183, with perspector component dimensions and/or structure adjusted accordingly.

In the FIG. 2 example, the sensor data set generated at each sensor-device position/orientation (SPO) is constituted by a data capture tuple 190 (i.e., multiple distinct metrics combined in a data structure) that includes, for example and without limitation, image data (array of pixel values), imager resolution/intensity profile at which the image was captured, relative sensor-object orientation (e.g., coordinates x, y, z, ϕ, θ as discussed above, including possible yaw angle), object weight, spectrographic information, speeds/velocities/accelerations, ambient illumination information (e.g., as sensed by a luminance/intensity meter and/or based on pixel intensity values in the captured image). The data capture tuple may also include information synthesized from data capture at one or more sensor positions/orientations (e.g., object size as determined, for example, by triangulating/extrapolating object extents from stereoscopic image capture at a given SPO, image capture at different sensor-device positions/orientations, and/or direct sensor-to-object distance measurement using, for example, a time-of-flight image sensor, LIDAR sensor, proximity sensor, etc.) as well as information encoded within one or more features of the object itself (e.g., barcode or QR code) and information supplied as part of the information capture guidance (e.g., data capture profile supplied by cloud-based AI engine). More generally, any information that may be obtained, inferred, deduced, synthesized or otherwise generated with respect to the object of interest may recorded within the data capture tuple and thus within the object data set to be returned to the AI engine.

Figure 3:
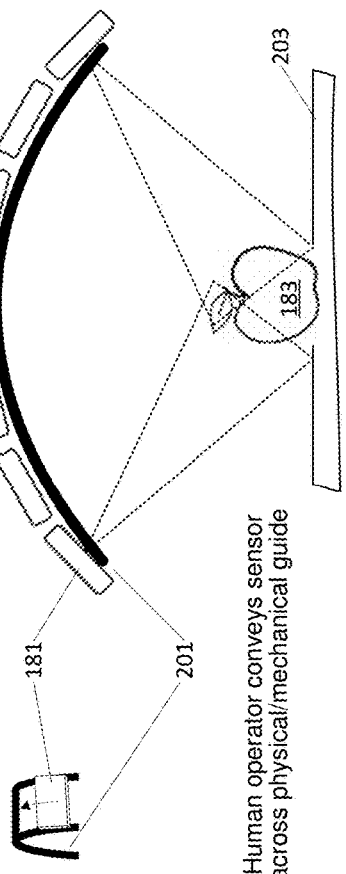
FIG. 3 illustrates an embodiment of a perspective information generator in which a human operator conveys a handheld/portable sensor device over a mechanical guide.

FIG. 3 illustrates an embodiment of a perspective information generator in which a human operator conveys a handheld/portable sensor device 181 over a mechanical guide 201. In the example shown, mechanical guide 201 is constituted by a track that arcs over a surface of interest 203 (at which object of interest 183 is disposed) to enable generation of positionally-varied perspective images of the object of interest (i.e., within an imaging sensor of sensor device 181) as the sensor device is conveyed (slid) along the track. In a number of embodiments, sensor device 181 is moved relatively free-form with respect to mechanical guide 201 (e.g., track)—for example, with the exact overlay of the sensor device onto the track (of mechanical guide 201) being uncontrolled, and in other embodiments, the offset between rails of the track may be adjustable to engage edges of the sensor device and thus limit positional variance of the sensor device outside the desired trajectory. In yet other embodiments, a carriage (not specifically shown) to which the sensor device may be detachably mounted (and/or in which one or more sensors are integrated) is securely or removably mounted to the guide/track so that the sensor device traverses a completely controlled arc as a human operator moves the carriage from one end of the guide to the other. In yet other embodiments, mechanical guide 201 may be implemented by a radial member (e.g., spoke or rod to which the sensor device is detachably mounted and/or that integrates one or more sensors) that enables motion of the sensor device in a 3D sphere or hemisphere with controlled distancing and/or sensor orientation with respect to object of interest 183. More generally, any practicable mechanical guide—with or without integrated sensors—may be used to implement a perspective information generator in whole or part, potentially providing a more accurate spatial reference information (e.g., relative position of sensor and object) than a handheld sensor device conveyed without mechanical guide.

Figure 4:
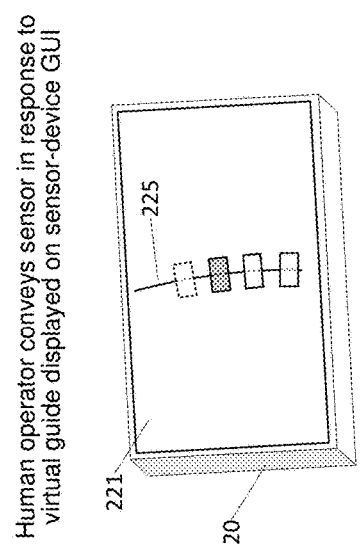
FIG. 4 illustrates an exemplary graphical display (e.g., on a display of a sensor device) used to guide human-operator-conveyance of a sensor device between successive object perspectives.

Referring to FIGS. 3 and 4, in one embodiment, a controller within a sensor device 220 (which may implement any of the sensor devices discussed above) executes program code to guide human-operator-conveyance of the sensor device from one data capture point (SPO) to the next (e.g., and thus a sequence of points forming a motion profile or path)—providing such instruction via a user interface 221 of the sensor device. In the FIG. 4 example, for instance, the executed program code illustrates a virtual path 225 (e.g., on a GUI of sensor device) corresponding to the physical path along which the user is to convey the sensor device (such conveyance occurring with or without aid of the Figure-3 mechanical guide), thereby guiding user conveyance of the sensor device along a desired data capture path (which may include multiple paths/vectors defining a hemisphere or dome or other virtual surface with respect to the object of interest).

FIG. 5 illustrates an exemplary data capture profile that may be implemented by the controller/programmed-processor of a user-conveyed sensor-device (i.e., through program code execution and user-interaction via sensor-device UI). Starting at 251, the controller triggers (or instructs a user to trigger) sensor data capture at an initial perspective—that is, at an initial position (including a given orientation) and illumination setting—and then determines the next data-capture perspective (position and/or illumination) based on the captured data tuple as shown at 253 and 254. More specifically, in a back-end-guided implementation 255 (e.g., cloud-based AI engine provides or supplements next-perspective guidance), the controller conveys the captured data tuple (e.g., as an object data set) to the AI engine at 257, and then receives the next sensor position/orientation (SPO) and/or illumination setting from the AI engine at 259, deeming the overall data capture to be complete upon receiving a null-valued next-SPO (or other indication of completeness) from the AI engine (261). In a sensor-device-autonomous data capture implementation 265, the sensor-device controller itself generates the next-position/illumination information, generating or revising an SPO/illumination profile (i.e., planned positions/orientations at which respective data-capture is to occur) based on the data-capture tuple at 265 and then selecting (implementing/effecting) the next SPO/illumination at 267 until the profile is completed (e.g., null-valued next-SPO as shown at 269). In such sensor-autonomous implementations, captured data tuples may be conveyed to the back-end AI engine iteratively (e.g., as collected) or in a bulk transfer, buffering captured data (object data sets) within the controller memory or other storage until a predetermined volume of (or all) sensor-data tuples have been captured. In any case, after determining next SPO/illumination at 253/254, the sensor-device controller instructs or guides the user in conveyance of the sensor to a next position/orientation and/or implements the next illumination setting (e.g., changing the state of one or more illumination sources) as shown at 281 and 282, respectively. Upon detecting that the sensor device has reached the target SPO (i.e., affirmative determination at 283—and which target SPO may be the pre-existing SPO in cases where perspective is changed solely by revised illumination setting) the controller triggers (or instructs a user to trigger sensor-data capture at 285. Thereafter, the controller repeats the data capture loop (starting with determination of next SPO/illumination at 253/254) using one or more or all of data-tuples (sensor data sets/object data sets) captured prior to the point of loop iteration.

FIG. 6 illustrates an exemplary data capture profile that may be implemented by program code execution within the controller of a perspector appliance. Starting at 301, the controller effects an initial data-capture perspective by either commanding one or more actuators to convey sensor(s) to an initial position/orientation (initial SPO), commanding an initial illumination setting, or both. Thereafter, the controller triggers sensor-data capture at 303 (e.g., capturing one or more images, collecting IMU data, recording geo-position, object weight, etc. in accordance with available sensors) and then determines the next sensor position/orientation and/or illumination setting based on the captured data tuple (305, 306), implementing the next SPO (actuating/conveying sensor(s)) and/or illumination setting (307, 308), and then looping back to repeat the data capture at 303 (and then the next SPO/illumination determinations at 305, 306). As in the FIG. 5 embodiment, the next SPO/illumination-including determination that data capture is complete—may be determined with AI-engine guidance (perspector iteratively transmits captured data to AI engine via network interface) or autonomously within the perspector (with possible joint determination of next SPO/illumination through coordination between AI engine and perspector-controller). Also as in the FIG. 5 embodiment, the controller may determine the next data-capture perspective (position and/or illumination) based on all or any subset of captured data tuples at the point of next-SPO/next-illumination determination.

FIGS. 7 and 8 illustrate perspector embodiments 330 and 350 having integrated and detachably-mounted sensor(s), respectively. In each implementation, the perspector includes, as constituents/components of the perspector frame, a base 331 having a rotary-actuated object platform 335 (e.g., turntable), and a sensor tower 337 mounted to the base and having multiple actuated degrees of freedom to establish various sensor perspectives. More specifically, in the depicted examples, the sensor tower includes a rotatable stand 339, a vertically-actuated sensor-arm holder 341, and rotatably-actuated sensor arm 343, the latter housing or having integrated therein or thereon one or more sensors/illuminators 345 as shown in FIG. 7, or having one or more mounting/securing elements 347 to enable detachable-mounting of a sensor device (e.g., smartphone, tablet computing device, etc. having integrated controller/sensor/illuminator components as discussed above). In either the FIG. 7 or FIG. 8 embodiments (and all others having an object table herein), an optional weight-scale 351, backlighting and/or interchangeable background surface (to implement backgrounds of varying color, reflectivity, texture, etc.) may be implemented with respect to object table 335 (e.g., forming the object table or a portion thereof) and/or one or more additional illumination components, sensor components (353, 355) and/or communication components (e.g., RF antenna) may be disposed at various locations with respect to the perspector frame—the latter (RF antenna) shown conceptually as a projecting structure at 357, though various integrated-circuit-chip-embedded or otherwise low-profile antennas may be implemented. As demonstrated by the actuation (motion) arrows shown with respect to object platform 335 and sensor tower 337, sensors integrated within or detachably mounted to sensor arm 343 may be moved in 3D space with respect to an object disposed on platform 335—moving the relative positioning of object 183 and sensor (345 or sensors integrated within sensor device 181) from position to position per the next sensor position/orientation (SPO) control discussed in reference to FIG. 6 and capturing sensor data as each successive SPO is reached (with or without motion-stop at the SPO). Mechanisms for actuating object table 335 and/or components of sensor tower 337 may include any practicable actuation structures including, for example and without limitation, rotary or linear electric motors (i.e., direct-drive or gear-drive motors with the latter driving belts, sprockets, lead screws, ball screws, worm gears or any other practicable power transmission structure), pneumatic actuators, hydraulic actuators or any other practicable power source, including actuators driven by potential energy supplied by a human user (cocking spring, compressing piston, raising mass, etc.). Also, instead of or in addition to actuating one or more sensors, any or all depicted actuators may move an illumination source or sources, and any actuated sensor(s)/illumination source(s) may be supplemented by one or more sensors/illuminators disposed at other actuation points (e.g., on rotatable object platform 335) and/or at fixed locations with respect to the perspector frame (e.g., mounted on base 331 or other frame-attach point). As discussed above, actuation control signals may be supplied wirelessly (e.g., Bluetooth, NFC) or via wired connections according to any practicable protocol.

Figure 10:
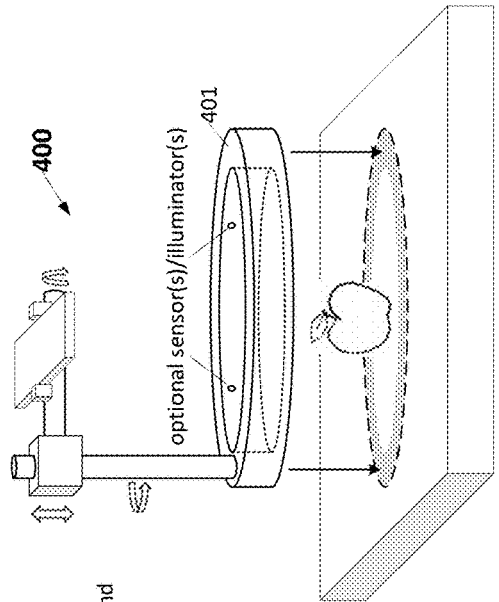
FIGS. 9 and 10 illustrate perspector embodiments having various alternative (and non-exhaustive) sensor/illuminator actuation schemes.
Figure 9:
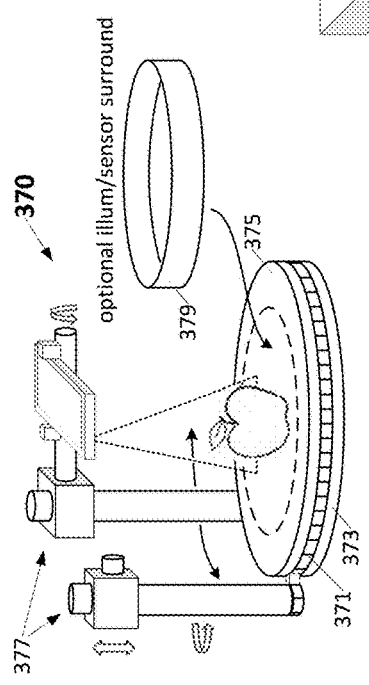

FIGS. 9 and 10 illustrate perspector embodiments having various alternative (and non-exhaustive) sensor/illuminator actuation schemes—each in the context of a detachably mounted sensor-device, though perspector-integrated sensors may be implemented (alternatively or additionally) in all cases. In the FIG. 9 "circumnavigating" perspector embodiment 370, a rotary carousel member 371 is implemented with respect to an otherwise fixed base 373 and object table 375. A sensor tower 377 (shown in alternative positions and, in the foreground instance, without the entirety of the sensor-bearing arm) may be implemented generally as shown and discussed with respect to FIGS. 7 and 8 and mounted to the carousel member to enable conveyance of the sensor arm around the object table (i.e., circumnavigating the object table and thus any object disposed thereon). As shown, an optional illuminator "surround" 379 (which may also or alternatively bear one or more sensors and/or one or more light-diffusion elements) may be disposed on (attached to and/or overlaid upon) object table 375-*a* construct that may be employed with respect to all perspector embodiments herein.

In the FIG. 10 embodiment, perspector 400 lacks an object table altogether and instead includes, as part of the perspector frame, a base member or stand that enables the perspector to be mounted over (or otherwise in strategic position with respect to) an object of interest—in this case a ring structure 401. In alternative embodiments, the over-mount structure may be implemented by a footed-stand (e.g., having one or more feet, optionally adjustable or having mechanical swivels or other mechanisms to enable disposition of the perspector on a non-planar surface) or any other practicable perspector support structure.

Figure 11:
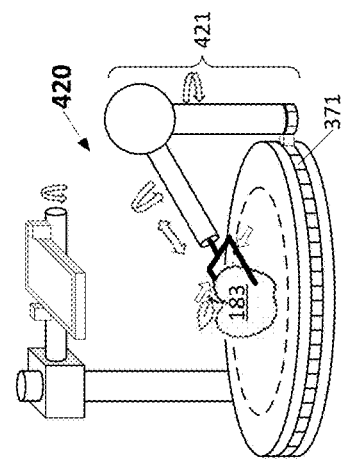
FIG. 11 illustrates a perspector embodiment incorporating a mechanical object manipulator that is actuated pursuant to a next position/next orientation profile to rotate and/or translate an object of interest to yield successive next positions/orientations with respect to fixed or actuated sensors/illuminators.

FIG. 11 illustrates a perspector embodiment 420 incorporating a mechanical object manipulator 421 that is actuated pursuant to a next position/next orientation profile as discussed in reference to FIG. 6—that is, manipulator rotating and/or translating object 183 to yield successive next positions/orientations with respect to fixed or actuated sensors/illuminators. Though depicted as a robotic arm (with grip) mounted to a circumnavigating member (e.g., rotating member 371 as discussed in reference to FIG. 9), any mechanical structure useful for repositioning/reorienting an object of interest may be implemented in alternative embodiments and mounted to any practicable point with respect to the perspector and/or object, including a manipulator disconnected from the primary frame of the perspector.

FIG. 12 illustrates a perspector embodiment 440 that may be disassembled and compacted (folded, retracted, etc.) by a user for portable/compact stowage. In the depicted example, a stowage compartment 441 is implemented within a base member 443 of the perspector frame, the compartment having a form-factor/outline that matches a folded instances of a removable sensor tower 445 (i.e., folding sensor-arm 447 down to yield a compact structure that fits snugly within the base-member compartment). While frame-member stowage is shown in accordance with the FIG. 9 circumnavigating perspector embodiment, stowable compartments, removable foldable/compactable frame members and/or stowed-component attach points may be implemented with respect to any and all perspector embodiments presented herein.

FIG. 13 illustrates yet another perspector embodiment 460, in this example having a "fly-over" arm 461 rotatably attached to a base member 463, thus enabling one or more sensors/illuminators integrated within the fly-over arm, or sensor device removably attached to the fly-over arm, to follow a semi-circular "fly-over" trajectory with respect to an object disposed on platform 465, the latter being subject to optional rotary actuation. In the depicted embodiment, fly-over arm 461 telescopes from a retracted fold-away position (i.e., for compact stowage) to one or more extended positions to enable a desired radial distance between integrated and/or detachably mounted sensors/illuminators and the object of interest. In one implementation, fly-over-arm extension is effected by a human user (making ready for object-recognition training for example by extracting the fly-over arm to one or more detent positions), and in others by an actuator or actuators to enable dynamic adjustment (including revised arm extension during a given sweep over the object of interest) of the radial distance between sensor/illuminator and object. The fly-over motion itself (i.e., rotation of fly-over arm 461 over object platform 465 and thus over an object of interest) may be motorized (e.g., electric motor) or actuated by user-stored potential energy (e.g., human operator moves fly-over arm from initial resting position to "cocked" position with respect to object platform, loading one or more springs, pneumatic/hydraulic piston, etc. that subsequently power the sweep of the arm back to the resting position).

In the various perspector embodiments disclosed herein relatively low-cost actuator/manipulator structures-having, for example, relatively coarse and/or low-accuracy positional feedback elements, or no positional feedback elements at all—may be deployed to move actuation members (turntable, pivoting/fly-over arm to which smartphone or other sensor device is attached, etc.) between successive object-data capture positions/orientations. In such embodiments, positioning/movement information from relatively high-accuracy sensors available within perspector-mounted sensor devices (e.g., IMU and/or other sensors integrated within smartphone) is leveraged to ascertain sensor position/orientation information with substantially higher precision (resolution and/or accuracy) than possible using actuator-integrated feedback elements alone. In yet other embodiments, positioning information from the smartphone or other sensor device is additionally used to enable actuator movement (e.g., to an absolute or relative position) with increased resolution/accuracy relative to that possible using actuator-integrated feedback elements alone. In perspector embodiments where one or more actuated degrees of freedom are implemented by open-loop motion control elements (i.e., actuator lacks positional/motion feedback component altogether), positioning information from the smartphone or other sensor device (e.g., IMU data) may be used to ascertain sensor device positions during and/or after actuator-induced movement of the sensor device and may further be leveraged to implement closed-loop motion control. In yet other embodiments, relative or absolute rotation (and thus angular position) of an object-bearing carousel or turntable (e.g., relative to a predetermined starting orientation) may be ascertained from successive images captured by the sensor device (e.g., tracking displacement (movement) of calibration marks or other fiducial characteristics of the turntable within those images) with such positioning information used to (i) ascertain relative orientation between sensor device and turntable-borne object at a given image capture point and/or (ii) control actuation of the turntable to successive positions (i.e., effect and/or supplement closed-loop motion control). In yet other embodiments, particularly those where inadvertent or intentional user contact with actuated perspector elements (e.g., pivot arm) is expected, drive-train protection elements may be provided to avoid/mitigate damage to actuator components (gears, spindles, couplings, motors, etc.). Further, where one or more actuators deployed within a given perspector embodiment exhibit undesired play (internal motion between drive-train components that yields no or negligible actuation) that may affect motion accuracy and/or create mechanical disturbances (e.g., vibrations that may affect image capture), various biasing mechanisms may be employed to pre-load the transmissions/drive-trains of such actuators so as to eliminate or mitigate such motional play. In yet other embodiments, counter-balancing mechanisms may be deployed (e.g., within the drive-drain of a perspector) to reduce incurred torque or force (e.g., from gravity and/or biasing components) and thus enable perspector implementation with relatively lower cost drive-train/motive components.

FIG. 14 illustrates a more generalized embodiment (500) of the fly-over perspector of FIG. 13, in this case having a base 501, actuated turntable 502 (on which object 503 is mounted) and fly-over arm 504, the latter pivoting about point 505 and having a sensor-attachment structure (506) for removably mounting a sensor device 507 (e.g., smartphone having integrated imager(s), IMU, GPS, proximity sensors, Lidar, etc.). A fly-over actuator implemented within base 501 (and thus not visible in FIG. 14) rotates a fly-over axle attached to arm 504 at pivot point 505 and thus conveys sensor device 507 through a profile arc (radius established by distance between pivot point 505 and attach-point of sensor device 507) to enable image capture from various sensor positions/orientations—in one embodiment moving the sensor device through a 90° profile arc in a plane normal to the axis defined by the fly-over actuator axle. A turn-table actuator also implemented within base 501 rotates turntable 502 about a center axle (axle normal to and aligned with geometric center of circular turntable and, in some cases, aligned with an imaging aperture of sensor device 507 when fly-over arm is at maximum elevation) through at least a semicircular range (180°) so that, together with the nominally 90° arc of the sensor device, the entire surface of object 503 may be positioned within the field of view of sensor device 507.

Still referring to FIG. 14 and taking object 503 as a point of reference, actuation of the turntable may be viewed as a relative angular rotation of sensor device in a circular longitudinal path about an axis normal to the surface of and passing through the center of turntable 502 (i.e., sweeping or incrementally moving sensor device 507 through a longitudinal angle $\phi$ between at least 0° and 180°), and actuation of fly-over arm 504 as an angular rotation of sensor device 507 in a circular latitudinal path through a plane normal to the surface of turntable 502 (sweeping or incrementally moving sensor device 507 through a latitudinal/tilt angle $\theta$ from 0° or a somewhat elevated sensor-device loading position to at least 90°). Thus, the longitudinal and latitudinal actuators (turntable actuator and fly-over arm actuator, respectively, enable sensor device 507 (and more specifically the aperture of an imaging device integrated within sensor device) to be moved between successive data-capture points anywhere on a conceptual hemispherical surface covering the object of interest (e.g., having a fixed radial distance between aperture and center of turntable 502 or other point on turntable). Each data-capture point constitutes a respective sensor position/orientation (e.g., as discussed in reference to FIG. 2) that may be expressed in polar coordinates and/or a combination of Cartesian coordinates (X,Y,Z—indicating location of sensor device in 3D space) and polar coordinates (indicating orientation of sensor device in 3D space.

In one embodiment, processing circuitry within sensor device 507 (e.g., executing application program code) issues a sequence of movement instructions to perspector 500 (each including coordinates of a next sensor position/orientation as discussed above) to which the perspector responds by instructing corresponding movement of the turntable actuator and/or fly-over arm actuator. In a perspector embodiment having relatively low resolution (and low cost) actuator positional feedback elements (e.g., relative or absolute angular positioning encoders/sensors), angular positions associated with respective actuator starting and ending points would ordinarily be constrained accordingly. For example, if a tilt position sensor provided to track latitudinal/tilt angle (i.e., rotation of fly-over arm 504 about pivot point 505) is limited to five degree (5°) resolution (i.e., able to distinguish 18 position offsets from a zero-angle reference over a 90° range) and thus be (i) unable to sense actual fly-over arm tilt angle within a given 5° step and (ii) unable to actuate fly-over arm 504 to intermediate positions between any 5° step (e.g., unable to carry out commands to rotate to intermediate points within any 5° step). Turntable position-sensing resolution and position actuation resolution may likewise be constrained (i.e., where implemented with low-cost, low resolution actuated-position sensor). As mentioned above, these constraints are overcome within perspector embodiments herein by leveraging higher precision (higher resolution and/or accuracy) positioning information from perspector-mounted sensor device 507 to more precisely determine, by virtue of sensor device position, the actual angular position of the actuator axes (longitudinal and latitudinal, though lineal positions may also be determined) and to command and control more precise motion of the perspector actuators-detecting positions at finer resolution than possible using actuator-integrated position sensors alone and moving to positions with finer resolution/accuracy than possible using actuator-integrated position sensors alone.

In a number of embodiments, positioning information from a low-resolution actuator-integrated position sensor is transmitted from perspector 500 to attached sensor device 507 where it is combined (if needed) with more accurate/resolute positioning information from the IMU or other integrated position sensors within sensor device 507 to yield more accurate/resolute positioning information than available from the actuator-integrated position sensor alone. For example, positioning information from an absolute or relative rotary position encoder attached to the fly-over arm pivot axle (i.e., defining pivot point 505) and having N° resolution may be supplied to sensor device 507 for combination with M° resolution IMU positioning data (where N/M=2, 5, 10, 25, 100, 1000, etc.) to generate a finalized angular position of fly-over arm 504 with improved resolution (less than N°) and accuracy relative to that available from the rotary position encoder alone. Moreover, in addition to more accurately assessing (sensing) position of actuator components and/or sensor device position/orientation, sensor device 507 (and more specifically a processing unit therein) may leverage the more resolute positioning information by instructing more resolute motion, for example, commanding perspector 500 to actuate fly-over arm 504 (or turntable 502) for a period of time until a desired intermediate position (between two points N° apart) has been reached, issuing a stop-motion command at that point. In other embodiments, high precision positioning information is synthesized within controller circuitry of perspector 500 (e.g., element 145 of FIG. 1) rather than (or in addition to) synthesis within sensor device 507—positioning information flowing from sensor device 507 to the perspector controller circuitry for combination therein with the lower resolution (but possibly absolute) positioning information obtained from a lower-resolution actuator-integrated sensor. Where positional information from sensor device 507 (e.g., from an IMU or other positional sensor therein) is received within the perspector in real-time, that information may be applied to enable perspector-controlled execution of high-resolution positioning commands-moving turntable and/or fly-over arm to angular offsets with higher resolution/accuracy than possible using actuator-attached sensors alone.

In a number of embodiments, high precision positioning information is synthesized (i.e., within sensor device and/or controller of perspector appliance) through combination of gravitationally-referenced IMU data (e.g., yaw, tilt, pitch-often with fractional degree resolution—and displacement) with perspector-referenced actuator position data—an approach that enables positional values reported by the IMU with respect to Earth's gravity to be re-aligned with a physical orientation of the perspector (e.g., base resting on surface not perfectly normal to the gravitational direction). Moreover, positional information from the embedded IMU (or other integrated sensor) within the perspector-mounted sensor device is applied to correct and/or interpolate between positions of the perspector actuator(s). As an example, FIG. 15 illustrates exemplary positioning of the perspector fly-over arm 504 (at 540) to make ready for attachment of a sensor device 507 (e.g., smartphone) having an integrated IMU 521. Where implemented with relatively low resolution actuator-attached positioning sensors—e.g., 5° tilt-angle increments—the perspector device may initially report (and internally record) the fly-over arm position at 30°, whereas, the sensor-device IMU 521 may indicate (upon sensor device attachment as shown in 545) a tilt angle of 33° and thus a 3° discrepancy. This tilt-angle discrepancy may result from inaccuracy in the tilt angle reported by the low-resolution actuator-attached position sensor and/or angular offset between the gravitational direction and the axis of rotation of the perspector turntable (i.e., plane in which turntable rotates not normal to gravitational direction) and also possibly due sensor-device mounting error (or play in the attachment thereof via perspector mounting elements 506). In any case, because the sensor device and perspector are mechanically coupled, the perspector (and/or application executing within the sensor device) may leverage the higher accuracy/finer resolution of the IMU within sensor device 507 to interpolate more precise positions of the fly-over arm—for example, resolving successive positions of the fly-over arm reported by an actuator-attached sensor with relatively coarse resolution (e.g., 30°, 35°, 40°, 45°, etc.) with corrective offset and much finer granularity (e.g. 33.2°, 38.9°, 43.5°, 48.1°, etc.).

Returning to FIG. 14, perspector 500 and/or sensor device 507 may also confirm proper sensor-device attachment to fly-over arm 504 through comparison of information from actuator-attached positional sensors (components of perspector 500) and sensor-device integrated sensors (e.g., IMU), deeming the sensor device to be properly engaged (coupled, secured or attached to perspector 500) where, for example, tilt angles indicated by positioning information from those two sources (perspector and sensor device) are within a predetermined or programmed discrepancy threshold and, conversely, alerting a user to improper/inadequate attachment in response to detecting an over-threshold discrepancy. The sensor device may alternatively or additionally leverage the presence of fiducial perspector features (e.g., as shown at 513) within the field of view of an imaging component of the sensor device (and thus having an expected location within the frame of a digital image) to confirm proper sensor-device attachment to the perspector fly-over arm.

In another embodiments, positional information from actuator-attached position sensors and/or a perspector-mounted sensor device may be used to discern actuator disposition within one or more zones (motion-ranges) or positions-including, without limitation, a non-operating (out-of-bound or disallowed) zone, sensor-data collection zone, sensor-device loading position and stowed position as shown in 515. The various positions and positional zones may be leveraged in program code executed within the sensor device and/or perspector (e.g., within a processing element thereof) to alert, stop or prevent actions which would be harmful to a user, attached sensor device and/or perspector (e.g., damage to actuator components due to forced movement of fly-over arm into non-operating zone; damage to sensor device due to forced or inadvertent conveyance into the zone between the loading position and stowed-position; etc.).

The relatively high accuracy/resolution positioning information from sensor device 507 may be further leveraged to enable more resolute/accurate actuator movements (e.g., of fly-over arm 504 and turntable 502) than possible from actuator-attached positioning feedback alone. In a number of embodiments, control circuitry within perspector 500 includes a command interface (or application programming interface) that enables sensor device 507 to wirelessly transmit various types of motion control commands including, for example and without limitation, motion-start commands, motion-stop commands, commands to actuate until a predetermined position is detected by actuator-attached position sensors (e.g., sensor-loading position, stow position, etc.) and so forth. The motion start and stop commands may be accompanied by movement profile commands (specified acceleration from stopped state to specified initial velocity, followed by deceleration to specified final velocity) and may be issued in pairs to enable continuous motion from a starting position (i.e., issuing a motion-start command) to a stopping position, where the latter is achieved by detection, using higher-accuracy sensor-device positioning data (e.g., from IMU), of a desired stopping position (or imminent arrival at such position at pre-specified final velocity) and issuance of a motion-stop command. More specifically a movement command is issued to perspector 500 (e.g., to actuate the fly-over arm or turntable or both) and a higher resolution change of position is monitored within sensor device 507 (i.e., monitoring IMU data to detect fly-over arm tilt angle, monitoring imaging data to detect position of fiducial indicators on turntable, etc.) such that when the actuator reaches a desired position (or such arrival is expected at a time corresponding to a predetermined or run-time calibrated latency for motion control command execution), sensor device 507 issues a motion-stop command to perspector 500 to halt actuator motion. As a more specific example, again assuming a 5° actuator-attached position sensor resolution, if the fly-over arm 3 is to be positioned at a 28° tilt angle (relative to 0° stow-away reference position) to enable sensor-device loading, sensor device 507 may send a position command of 25° to perspector 500 (after accounting for corrective offset positioning information from sensor device and actuator-attached sensor) which responsively moves to an actuator-sensor-reported 25° tilt angle. Thereafter, the sensor device may issue a motion-start command to the perspector to rotate the fly-over arm upwards (increasing elevation and tilt angle) while monitoring the inclination information from the sensor-device-integrated IMU. Upon detecting (from IMU positioning information) that the 28° elevation has been reached or will be reached by the time a motion-stop command has been executed, the sensor device issues a motion-stop command to the perspector to halt rotation of the fly-overarm and thus achieve positioning of the fly-over arm (e.g., at 28°) with higher resolution than possible using positioning information from actuator-attached positioning sensors alone. A similar approach may be implemented with respect to turntable 502 using, as discussed above, positioning information derived from images captured during turntable motion (e.g., positional change of fiducial marks/features of turntable 502 within the field of view of sensor device as detected through processing of successive digital images captured by sensor device 507). Thus, by issuing actuator-start/stop commands to perspector and ascertaining timing of motion-stop command in whole or part using higher resolution positioning data from sensor device 507, actuators within perspector 500 (e.g., fly-over arm actuator, turntable actuator, etc.) may be driven to successive positions with higher resolution/accuracy than possible using actuator-attached position sensors alone. In yet other embodiments where actuators within perspector 500 may implement open-loop incremental translation or rotation (i.e., stepped by a predetermined and nominal angular or lineal increment), sensor device may command the perspector (i.e., issuing motion commands thereto) to implement a predetermined number of such incremental actuator movements, fine-tuning the final actuator position (issuing one or more follow-on incremental motion commands to move slightly further or back) based on information from high-resolution integrated sensors (e.g., sensor-device-integrated IMU).

In other enhanced-positioning embodiments, sensor device 507 continuously transmits relatively high-resolution IMU positioning data to perspector 500 which, in turn, applies that information to implement closed-loop actuator movement and positioning. As the positioning feedback loop (and/or velocity, acceleration, jerk, etc. feedback loops) is closed through cooperation of components within the perspector and detachably mounted sensor device, such embodiments are referred to herein as composite actuator positioning systems. In some composite positioning embodiments, positioning information feedback is rendered entirely by the sensor device (e.g., IMU therein) at least during object-data capture, with actuator-attached positioning devices used only prior to sensor-device attachment (e.g., to move fly-over arm into loading or stow-away positions) or omitted altogether (e.g., movement to sensor-device loading and/or stow-away effected by travel-limit switches or the like).

FIG. 16 shows an exemplary underside view of the FIG. 15 perspector (e.g., looking through a bottom cover of base 501), showing components of the fly-over arm and turntable actuators (including positioning sensors attached thereto) together with an actuation controller 550 (e.g., implemented by a microcontroller and/or other processor). In the depicted embodiment, sensor device 507 issues actuation/motion control commands and/or positioning information to actuation controller 550 (and receives positioning and status information therefrom) wirelessly as discussed above, and controller 550 responsively outputs control/enable signals to actuator components to effectuate the commanded operations. In response to commands to re-position fly-over arm 504, for example (e.g., commands to move fly-over arm to a specified position indicated in whole or part by sensor-device-provided positioning information, move fly-over arm by a specified number of pitch-angle increments, move fly-over arm continuously until commanded to stop, etc.), actuation controller 550 issues control/enable signals to fly-over motor 551 which, when enabled, rotates gear 553 (via spindle 555, clutch or slip-torque limiter 557 and spindle 558) and thus, via gear 559, fly-over axle 561, actuating fly-over arm 504 and attached sensor device 507.

In the FIG. 16 embodiment, positioning disc 567 is affixed to and rotates with fly-over axle 561 such that a sequence of different encoding patterns (e.g., patterned openings and/or reflective/sense-able elements as shown in detail view 568, each corresponding to a respective angular position of fly-over axle 561 and thus a respective pitch angle of fly-over arm 504) pass in proximity to and are sensed by pattern detector 569 (the positioning disc and pattern detector collectively constituting an actuator-attached rotary positioning encoder) to yield absolute rotary positioning information. The rotary positioning information is returned to controller 550 to enable, in response to positioning commands at least, closed loop motion control with resolution/accuracy in accordance with the encoding pattern resolution (number of different patterns per arc of revolution) and the accuracy of pattern placement and sensing. A similar closed-loop arrangement is effected with respect to turntable 502 via turntable motor 571 and spindle 572 and slip-torque limiter 573 (and optional gearing structure, not specifically shown), positioning disc 575 and pattern detector 577 and in both or either instances an incremental positioning encoder may be deployed (i.e., generating quadrature pulse trains as shown for example at 581 indicative of relative angular motion and direction thereof). As discussed above, while higher-resolution/accuracy positioning encoders may be deployed in any and all embodiments herein, the actuator-attached positioning encoders shown in FIG. 16 (i.e., 567/569 and 575/577) may be implemented by lower-cost, lower resolution positioning encoders (e.g., relatively coarse 5° angular displacement between adjacent positional patterns) or even omitted altogether (e.g., in composite positioning embodiments), with higher resolution/accuracy positioning achieved by leveraging positioning information from sensor device 507. Through this approach, relatively high resolution/accuracy sensor device actuation is achieved using a relatively low-cost, consumer-affordable perspector appliance.

The FIG. 16 perspector embodiment includes features to prevent mechanical damage to its various components—especially those in the drive-trains of the turn-table and fly-over arm-during intended or inadvertent interaction with a human operator (e.g., when attaching or detaching sensor device to/from fly-over arm, or accidental contact during perspector operation). In a number of embodiments, for example, one or more position sensors integrated within the perspector (e.g., travel limit switches and/or aforementioned actuator-attached position sensors such as position encoder 567/569) may detect configuration of fly-over arm in the stowed position and/or at any position below the sensor-device loading position (e.g., as shown at 515 in FIG. 14). The perspector may respond to such positioning information by communicating to a yet-to-be attached sensor device that the perspector is not ready for sensor device attachment—and, conversely, communicating a ready-for-attachment message to the sensor device when the fly-over arm has reached the sensor-device loading position.

With regard to sensor-device loading, in one embodiment, a user 29 manually raises fly-over arm 504 to an elevation (pitch angle) with sufficient clearance for attachment of the sensor device. To ensure a repeatable sensor-device loading position, the fly-over arm and/or perspector frame/body (e.g., at or near pivot point 505 in FIG. 14) may include fiducial marks/features or other user-visible cues to enable a user to discern fly-over arm alignment with the desired sensor-device loading position (e.g., user can visually align the fly-over arm with visible fiducial marks on the perspector to make ready for sensor device attachment). In other embodiments, the fly-arm and related motion hardware (e.g., pivot axle 561) may implement a mechanical detent or temporary hard stop which a user can feel as a change in force signaling that the fly-over arm has arrived at a desired sensor-device loading position. In yet other embodiments, the perspector may respond to user input (e.g., pushing "sensor-load" button implemented on perspector frame, receiving sensor-load input from sensor device in response to user input to make ready for sensor loading, etc.) by automatically raising/moving the fly-over arm to the sensor-device loading position (e.g., leveraging relatively low resolution actuator-attached positioning sensors as discussed above). These and other embodiments (user manually to position, perspector responds to user input) may be deployed also with respect to the perspector turntable (or other actuated components) to make ready for object disposition thereon.

As discussed in reference to FIG. 16, actuation controller 550 controls and manages motion of component actuators during normal operation—for example, engaging fly-over arm motor 551 to acuate fly-over arm via axle 561 via gears 553, 559 (collectively implementing a "gear box"), and engaging turntable motor 571 to actuate turntable 502 via comparable drive-drain components. To prevent/mitigate damage to the actuator drive-drain/transmission components, one or more elements may be integrated with the actuator transmission to provide tolerance for inadvertent or unexpected obstruction (e.g., user inadvertently or purposely interferes with actuator motion, feature of object of interest or nearby object extends into path of actuated member, etc.). In the FIG. 16 embodiment, for example, the aforementioned slip-torque limiter 557 is coupled between the output spindle 555 of fly-over arm motor and gear-connect spindle 558 (the latter affixed to gear 553 which meshes with counterpart gear 559 on fly-over-arm axle 561) to enable the two spindles to slip (i.e., be angularly displaced) relative to one another where obstructive force beyond a predetermined threshold is applied to the fly-over arm. That is, if the fly-over arm encounters an unexpected obstruction during actuation (including unexpected manipulation by a user), motor spindle 555 may continue to turn while gear-attached spindle 558 stops or turns at a different speed/direction, thus preventing damage to components within the fly-over arm transmission (i.e., motor 551, spindles 555, 558, gears 553, 559, axle 561, etc.). When such torque-limiter slippage does occur, actuation controller 550 may determine and/or continue to track position of the fly-over arm through positional sensor 567/569 and/or using positional information provided by attached sensor device 507. Accordingly, once the obstruction/motional-interference is removed or discontinued, controller 550 may issue movement commands to the fly-over actuator (e.g., enabling activation of motor 551) as necessary to restore the fly-over arm to a desired position and/or continue a data-collection movement profile. Slip-torque limiter 572 is likewise provided in the drive-train of turntable 502 (e.g., coupled between turntable-motor spindle 572 and a gear-attached spindle or elsewhere in the transmission path between spindle 572 and turntable axle) to prevent damage that may otherwise occur due to unexpected motional-interference. In one embodiment, the turntable slip torque limiter 573 enables both drive-train slip (e.g., where over-threshold torque occurs between the motor-side and drive-side spindles) and convenient removal of turntable 502 from perspector base 501. In the case where the slip torque limiter 573 slips and the positional sensor 567 only provides for relative positional displacement information, the actuation controller 550 may not know the actual position of the fly-over arm 504. In one embodiment, when the actuation controller 550 directs the fly-over arm 504 to a location and the fly-over motor 551 stalls and generates a higher than normal consumption current, the actuation controller 550 can initiate a calibration sequence whereupon the fly-over arm 504 is moved back and forth while actuation controller 550 monitors the fly-over motor 551 for other high current stall events or for special patterns on the positioning disk 567.

Still referring to FIG. 16, one or more bias components may be deployed in actuator drive trains (e.g., spring 587 attached to fly-over axle 561 and thus forming part of fly-over arm transmission) to reduce the motional play that otherwise plagues geared and clutched transmissions (especially at change in motional directional and/or gravitational bias)—play that, if left unmitigated, may produce unwanted wiggle or vibration during object data capture (degrading image clarity and/or accuracy of associated positional data) and generally appear as imprecise/flimsy operation. Referring to FIGS. 14 and 16, when fly-over arm 504 is at a pitch angle less than 90° (non-vertical) gravity provides a natural bias force against the fly-over arm transmission and consequently mitigates a tendency for the fly-over arm 504 to wiggle. Despite this bias, because any reversal of fly-over arm motion is effected by like reversal in the fly-over arm drive train, the drive-train components are driven (upon such reversal) in a direction opposite their prior direction for a time (i.e., in order to remove the transmission play) during which fly-over arm itself may float (undriven) and thus may vibrate or wiggle. Moreover, when the fly-over arm is at elevational zenith (i.e., vertical, 90° pitch angle as shown in detail view 515 of FIG. 14), no gravitational force is applied against the fly-over arm transmission, providing further opportunity for vibration/wiggle. Biasing spring 587 avoids the undriven/floating state of the fly-over arm by keeping a small force against the fly-over arm axle 561 in the direction of gravity (e.g., a simulated gravity biasing in one embodiment), thus ensuring that the fly-arm over arm does not float (not free to wiggle or vibrate) when the transmission drive direction is reversed or when the gravitational bias is removed (e.g., at vertical fly-over arm position) or reversed. Similar biasing structures (e.g., another bias spring) may be provided within the turntable transmission to maintain constant bias despite reversed turntable motion.

Still referring to FIGS. 14 and 16, when a relatively heavy sensor device (e.g., a large smartphone or a spectrometer) is attached to fly-over arm 504, a correspondingly high torque may be incurred within the fly-over arm drive drain-particularly when the fly-over arm is at or near the sensor-device loading point (i.e., torque being a function of pitch angle, sensor-device weight, and lever-arm distance between fly-over arm axle 505 and sensor device attach point). To avoid the higher cost of more robust/powerful motor and drive-train components that may otherwise be required to accommodate a maximum torque (gravitationally or otherwise induced), the maximum torque itself is reduced in a number of embodiments by deploying a counter-balance mechanism-a counterbalance spring 589 attached to the fly-over arm axle 561 in the FIG. 16 embodiment, with bias direction opposite that of the biasing spring 587. In one implementation, the counterbalance spring provides maximal counter-gravity force at the sensor-device loading position (being maximally wound) and minimal counter-balance force at the fly-over arm zenith (vertical position, 90° pitch angle), progressively relaxing (applying less counterbalance force) as fly-over arm 504 progresses from the loading position to the zenith.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various mechanical arrangements, sensor types, illumination schemes, actuators, drive-train components (including biasing and/or counterbalance components), controller/compute architectures, communication protocols, etc. are provided for purposes of example only-any practicable alternatives may be implemented in all cases. Communications between various sensor-device and/or perspector components may be implemented wirelessly and/or via wired connections (the latter implemented, for example, via multi-conductor buses or single signal lines). The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of determining change in relative positioning of a sensor device, removably attached to an appliance, with respect to an object disposed on the appliance, the method comprising:

actuating a first member of the appliance to effect the change in relative positioning of the sensor device with respect to the object;

obtaining, within a processing unit, first positioning information from one or more sensor elements within the sensor device indicative of change in spatial position of at least one of the sensor device or the object and corresponding to the change in relative positioning of the sensor device with respect to the object;

obtaining, within the processing unit, second positioning information from one or more constituent sensor components of the appliance indicative of change in spatial position of the first member of the appliance corresponding to the change in relative positioning of the sensor device with respect to the object; and synthesizing third positioning information from the first positioning information and the second positioning information, the third positioning information indicating a spatial position of at least one of the sensor device or the first member of the appliance after moving the first member of the appliance to effect the change in relative positioning of the sensor device with respect to the object.

2. The method of claim 1 wherein spatial resolution of the first positioning information is higher than spatial resolution of the second positioning information.

3. The method of claim 1 wherein the sensor device comprises a mobile phone and the one or more sensor elements within the sensor device comprise at least one of an inertial measurement unit or an image sensor.

4. The method of claim 1 wherein the processing unit is integrated, at least in part, within the appliance.

5. The method of claim 1 wherein the sensor device is removably attached to the first member of the appliance and wherein the one or more constituent sensor components of the appliance comprise at least one positioning sensor coupled to an element of the appliance involved in actuating the first member.

6. The method of claim 5 wherein the first member comprises a fly-over arm that, when actuated, rotates about a pivot point on the appliance to rotate the sensor device within a plane of motion normal to a surface of the appliance on which the object is disposed.

7. The method of claim 6 wherein the element of the appliance involved in actuating the first member comprises an axle that defines the pivot point on the appliance and wherein the at least one positioning sensor coupled to the element of the appliance involved in actuating the first member comprises a rotary positioning sensor attached to the axle.

8. The method of claim 7 wherein the one or more sensor elements within the sensor device comprise one or more sensor elements within an inertial measurement unit integrated within the sensor device.

9. The method of claim 1 wherein the first member of the appliance comprises a rotary turntable having a surface on which the object is disposed, the one or more sensor elements within the sensor device comprise an image sensor, and the first positioning information from the one or more sensor elements within the sensor device comprises positioning information indicative of degree of rotation of the turntable derived from one or more images captured by the image sensor.

10. The method of claim 9 further comprising actuating a second member of the appliance to effect the change in relative positioning of the sensor device with respect to the object, the second member comprising a fly-over arm to which the sensor device is removably attached and that rotates about a pivot point on the appliance to rotate the sensor device within a plane of motion normal to the surface of the rotary turntable, and wherein obtaining the second positioning information comprises obtaining a first portion of the second positioning information from at least one positioning sensor coupled to an element of the appliance involved in actuating the rotary turntable and obtaining a second portion of the second positioning information from at least one other positioning sensor coupled to an element of the appliance involved in actuating the fly-over arm.

11. A system comprising:
a sensor device having one or more sensor elements to provide first positioning information indicate of relative positions of the sensor device and an object;
an appliance to which the sensor device is removably attached and on which the object is disposed, the appliance having:
a first actuator to effect change in relative positioning of the sensor device with respect to the object; and
one or more sensor components to generate second positioning information indicative of change in spatial position of the first actuator corresponding to the change in relative positioning of the sensor device with respect to the object; and
wherein at least one of the sensor device and the appliance includes a processing unit to synthesize, using the first and second positioning information, third positioning information indicative of a spatial position of at least one of the sensor device or the first member of the appliance after the first actuator has effected the change in relative positioning of the sensor device with respect to the object.

12. The system of claim 11 wherein spatial resolution of the first positioning information is higher than spatial resolution of the second positioning information.

13. The system of claim 11 wherein the sensor device comprises a mobile phone and the one or more sensor elements of the sensor device comprise at least one of an inertial measurement unit or an image sensor.

14. The system of claim 11 wherein the processing unit is implemented exclusively within the appliance or within the sensor device.

15. The system of claim 11 wherein the sensor device is removably attached to the first actuator of the appliance and wherein the one or more constituent sensor components of the appliance comprise at least one positioning sensor coupled to the first actuator.

16. The system of claim 15 wherein the first actuator comprises a pivot axle and a fly-over arm that, when actuated, rotates about the pivot axle to rotate the sensor device within a plane of motion normal to a surface of the appliance on which the object is disposed.

17. The system of claim 16 wherein the at least one positioning sensor coupled to the first actuator comprises a rotary positioning sensor attached to the pivot axle.

18. The system of claim 17 wherein the one or more sensor elements of the sensor device comprise one or more sensor elements within an inertial measurement unit integrated within the sensor device.

19. The system of claim 11 wherein the first actuator comprises a rotary turntable having a surface on which the object is disposed, the one or more sensor elements within the sensor device comprise an image sensor, and the first positioning information from the one or more sensor elements within the sensor device comprises positioning information indicative of degree of rotation of the turntable derived from one or more images captured by the image sensor.

20. The system of claim 19 wherein the appliance additionally includes a second actuator to effect the change in relative positioning of the sensor device with respect to the object, the second actuator comprising a fly-over arm to which the sensor device is removably attached and that rotates about a pivot point on the appliance to rotate the sensor device within a plane of motion normal to the surface of the rotary turntable, and wherein the second positioning information comprises positioning information from at least one positioning sensor coupled to the first actuator and positioning information from at least one other positioning sensor coupled to the second actuator.

21. A system for determining change in relative positioning of a sensor device, removably attached to an appliance, with respect to an object disposed on the appliance, the method comprising:
 means for actuating a first member of the appliance to effect the change in relative positioning of the sensor device with respect to the object; and
 means for:
  obtaining first positioning information from one or more sensor elements within the sensor device indicative of change in spatial position of at least one of the sensor device or the object and corresponding to the change in relative positioning of the sensor device with respect to the object,
  obtaining second positioning information from one or more constituent sensor components of the appliance indicative of change in spatial position of the first member of the appliance corresponding to the change in relative positioning of the sensor device with respect to the object; and
  synthesizing third positioning information from the first positioning information and the second positioning information, the third positioning information indicating a spatial position of at least one of the sensor device or the first member of the appliance after moving the first member of the appliance to effect the change in relative positioning of the sensor device with respect to the object.

* * * * *